United States Patent [19]
Ikemoto et al.

[11] 4,384,805
[45] May 24, 1983

[54] FASTENING ARRANGEMENT BETWEEN SHAFT AND GEAR

[75] Inventors: Kazuhito Ikemoto; Nobuaki Katayama; Yukio Terakura, all of Toyota; Kan Sasaki, Aichi, all of Japan

[73] Assignee: Toyota Jidosha Kigyo Kabushiki Kaisha, Toyota, Japan

[21] Appl. No.: 286,975

[22] Filed: Jul. 27, 1981

[30] Foreign Application Priority Data

Aug. 20, 1980 [JP] Japan .................... 55-117924[U]

[51] Int. Cl.³ .............................................. F16D 1/06
[52] U.S. Cl. .................................... 403/357; 411/352
[58] Field of Search ................ 403/357, 356; 411/352, 411/516, 530, 511

[56] References Cited

U.S. PATENT DOCUMENTS

| | | | |
|---|---|---|---|
| 329,861 | 11/1885 | Stark | 411/516 X |
| 2,926,033 | 2/1960 | Zarrillo | 411/530 X |
| 3,169,032 | 2/1965 | Pastor | 403/357 |
| 3,245,365 | 4/1966 | Doherty | 403/356 |
| 3,388,934 | 6/1968 | Chapman, Jr. et al. | 287/52.05 |
| 3,561,799 | 2/1971 | Hutchinson | 287/52.05 |
| 3,703,305 | 11/1972 | Wise et al. | 287/52.05 |
| 3,964,833 | 6/1976 | Manriquez | 403/357 |

FOREIGN PATENT DOCUMENTS

50-148755 of 1975 Japan .

*Primary Examiner*—Andrew V. Kundrat
*Attorney, Agent, or Firm*—Oblon, Fisher, Spivak, McClelland & Maier

[57] ABSTRACT

A fastening arrangement for removably securing a gear or hub to a shaft by means of a spring wire clip which clip includes a curved portion formed by radially and circumferentially bending an intermediate portion of the clip for resilient engagement with an axial groove formed in a central bore of the gear, a pair of loop portions extending from opposite ends of the curved intermediate portion and arranged to be fitted around the shaft for engagement with either side surface of the gear, and a pair of detent pin portions formed by radially inwardly bending the end of each of the loop portions for engagement with a pair of radial holes formed in the shaft.

3 Claims, 6 Drawing Figures

FASTENING ARRANGEMENT BETWEEN SHAFT AND GEAR

BACKGROUND OF THE INVENTION

The present invention relates to a fastening arrangement between a shaft and a gear or hub mounted on the shaft, and more specifically it relates to a fastening arrangement for removably securing a gear or hub to a shaft by means of a spring wire clip and holding the hub against both axial and rotational movement relative to the shaft.

In the Japanese Patent Early Publication No. 50-148,755, a spring wire clip for such a removable fastening arrangement as described above has been proposed which includes a straight intermediate portion for engagement with an axial groove formed in a central bore of a gear or hub, a pair of loop portions extending from opposite ends of the intermediate portion and arranged to be fitted around the shaft for engagement with either side surface of the hub, and a pair of detent pin portions formed by radially inwardly bending the end of each of the loop portions for engagement with a pair of radial holes formed in the shaft. Although the fastening arrangement has advantages, it has been observed that if, due to manufacturing error, there is an undesired space at the circumference of the shaft between the axial groove in the hub bore and the intermediate portion of the spring wire clip, unpleasant noises will occur at the fastened portion of the hub.

SUMMARY OF THE INVENTION

It is a primary object of the present invention to provide an improved spring wire clip capable of eliminating any undesired space at the circumference of the shaft between the axial groove in the hub bore and the intermediate portion of the spring wire clip in the above-mentioned fastening arrangement thereby to eliminate unpleasant noises caused by such undesired space.

According to the present invention there is provided a fastening arrangement for removably securing a gear or hub to a shaft by means of a spring wire clip which clip includes a curved portion formed by radially and circumferentially bending an intermediate portion of the spring wire clip for resilient engagement with the wall of an axial groove formed in a central bore of the hub, a pair of loop portions extending from opposite ends of the curved portion and arranged to be fitted around the shaft for engagement with either side surface of the hub, and a pair of detent pin portions formed by radially inwardly bending the end of each of the loop portions for engagement with a pair of radial holes formed in the shaft. Such a fastening arrangement ensures that the hub is held against axial and rotational movement relative to the shaft without the occurrence of any undesired space between the intermediate curved portion of the clip and the wall of the axial groove.

Preferably, both the loop portions of the spring wire clip in their removed condition are axially inwardly curved to make the interval between said loop portions smaller than the width of the gear or hub. It is also preferable that both the detent pin portions of the spring wire clip in their removed condition are axially outwardly curved from the respective loop portions and arranged to be pressure engaged within the respective radial holes of the shaft.

BRIEF DESCRIPTION OF THE DRAWING

Additional objects and advantages of the present invention will be more readily apparent from the following detailed description of a preferred embodiment thereof when taken together with the accompanying drawing in which.

DESCRIPTION OF THE PREFERRED EMBODIMENT

Figure 1:
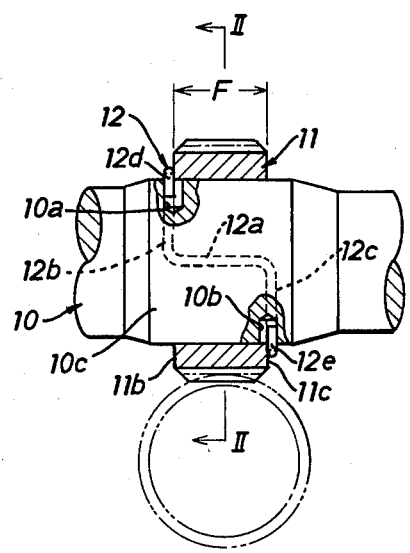
FIG. 1 is a cross-sectional view of a portion of an automotive power transmission unit showing a gear fastened to an output shaft of the unit in accordance with present invention.
Figure 2:
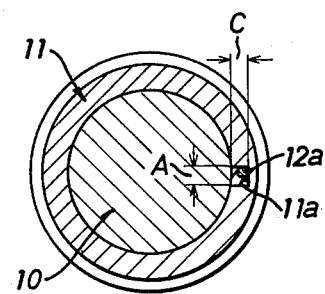
FIG. 2 is a sectional view taken along the plane of line II—II in FIG. 1.

Referring to the drawing, more particularly to FIGS. 1 and 2, the present invention is applied to a fastening arrangement between an output shaft 10 of an automobile power transmission unit and a gear or hub 11 adapted to drive the speedometer of an automotive vehicle. In this fastening arrangement, the gear 11 is removably secured to the output shaft 10 by means of a spring wire clip 12. As can be seen in FIGS. 1 to 4, the spring wire clip 12 includes an intermediate portion 12a for resilient engagement with an axial groove 11a formed in a central bore of the gear 11, a pair of loop portions 12b, 12c extending from opposite ends of the intermediate portion 12a and arranged to be fitted around a gear mounting portion 10c of shaft 10 for engagement with either side surface 11b, 11c of the gear 11, and a pair of detent pin portions 12d, 12e formed by radially inwardly bending the end of each of the loop portions 12b, 12c for engagement with a pair of radial holes 10a, 10b formed in the gear mounting portion 10c of shaft 10. The inner diameter of loop portions 12b, 12c is determined such as to be slightly smaller than the outer diameter of the gear mounting portion 10c of shaft 10.

Figure 6:
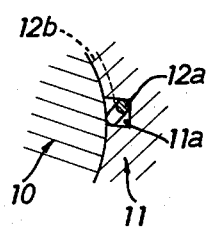
FIG. 6 illustrates an enlarged cross-section of a portion of FIG. 2.

In the above fastening arrangement, it is to be noted that the intermediate portion 12a of clip 12 in its condition prior to attachment is circumferentially curved to create a lateral deviation B slightly larger than the width A of axial groove 11a and is also radially curved to create a lateral deviation D slightly larger than the depth C of axial groove 11a. When assembled within axial groove 11a, the curved intermediate portion 12a is pressure engaged with the inside corner of axial groove 11a, as shown in FIGS. 2 and 6. As a result, the resilient engagement of the intermediate curved portion 12a with the wall of axial groove 11a serves to eliminate any undesired circumferential and radial space between the intermediate portion 12a of clip 12 and the wall of axial groove 11a thereby eliminating any occurrence of noises at the engaged portion of clip 12.

Furthermore, the spring wire clip 12 is characterized in that both the loop portions 12b, 12c in their removed condition are axially inwardly bent to make the interval E between said loop portions 12b, 12c smaller than the width F of gear 11. When assembled with the gear 11, the loop portions 12b, 12c are pressure engaged with either side surface 11b, 11c of gear 11 to eliminate undesired axial space between the gear 11 and the spring wire clip 12 thereby eliminating any occurrence of noises at the points of engagement of the loop portions with the gear 11.

To assemble the gear or hub 11 to the shaft 10, the curved intermediate portion 12a of clip 12 is firstly resiliently engaged within the axial groove 11a of gear 11, and the loop portions 12b, 12c of clip 12 are respectively resiliently engaged with side surfaces 11b, 11c of gear 11 such that the spring wire clip 12 is preassembled with the gear 11. Secondly, the gear 11 is placed on the shaft 10 with the preassembled clip 12, and it is slid over the shaft 10 with the loop portions 12b, 12c radially outwardly expanded. When the gear 11 is displaced to a predetermined position on the shaft 10, the detent pin portions 12d, 12e of clip 12 are respectively engaged within the radial holes 10a, 10b of shaft 10 due to resilient force of the expanded loop portions 12b, 12c to secure the gear 11 in position. The above operation is facilitated by the preassembly of clip 12 with the gear 11. To remove the gear 11 from the shaft 10, the detent pin portions 12d, 12e of clip 12 are retracted from the radial holes 10a, 10b of shaft 10 by manually pulling upwardly the loop portions 12b, 12c. At the point where the detent pin portions 12d, 12e clear the radial holes 10a, 10b the gear 11 may be readily slid axially and removed from the shaft 10.

Figure 3:
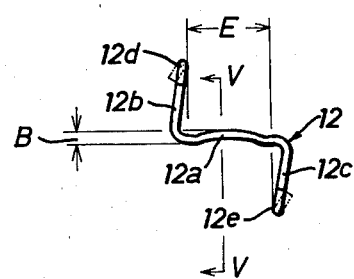
FIG. 3 is a front view of a spring wire clip shown in FIG. 1.
Figure 4:
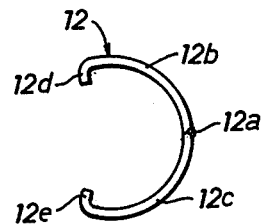
FIG. 4 is a side view of the spring wire clip of FIG. 3.
Figure 5:
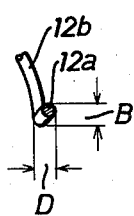
FIG. 5 is an enlarged cross-sectional view of an intermediate portion of the spring wire clip in its removed condition.

In the case that the detent pin portions 12d, 12e of clip 12 in their removed condition are curved axially outwardly from the respective loop portions 12b, 12c, as shown by imaginary lines in FIG. 3, the detent pin portions 12d, 12e are pressedly engaged within the radial holes 10a, 10b of shaft 10 to eliminate undesired axial space between the detent pin portions and the radial holes thereby eliminating any occurrence of unpleasant noises at the points of engagement of the detent pin portions with the gear.

Although in the foregoing specification a preferred embodiment of the concept underlying the present invention has been described in detail, various other embodiments as well as certain variations and modifications of the embodiment will obviously occur to those skilled in the art upon becoming familiar with said underlying concept. It is to be understood, therefore, that within the scope of the appended claims, the invention may be practiced otherwise than as specifically set forth herein.

What is claimed as new and desired to be secured by Letters Patent of the United States is:

1. In a fastening arrangement in which a spring wire clip is adapted to removably secure a gear or hub to a shaft, said spring wire clip including an intermediate portion for engagement with an axial groove formed in a central bore of said gear, a pair of loop portions extending from opposite ends of the intermediate portion and arranged to be fitted around said shaft for engagement with either side surface of said gear, and a pair of detent pin portions formed by radially inwardly bending the end of each of the loop portions for engagement with a pair of radial holes formed in said shaft;

the improvement wherein the intermediate portion of said spring wire clip in its removed condition is circumferentially curved to create a lateral deviation slightly larger than the width of said axial groove and is further radially curved to create a lateral deviation slightly larger than the depth of said axial groove such that when assembled within said axial groove of said gear, the curved intermediate portion of said spring wire clip is pressedly engaged with the wall of said axial groove.

2. A fastening arrangement as claimed in claim 1, wherein both the loop portions of said spring wire clip in their removed condition are axially inwardly bent to make the interval between said loop portions smaller than the width of said gear.

3. A fastening arrangement as claimed in claim 1 or 2, wherein both the detent pin portions of said spring wire clip in their removed condition are bent axially outwardly from the respective loop portions so as to be pressure engaged with said radial holes of said shaft respectively.

* * * * *

UNITED STATES PATENT AND TRADEMARK OFFICE
CERTIFICATE OF CORRECTION

PATENT NO. : 4,384,805
DATED : MAY 24, 1983
INVENTOR(S) : Kazuhito Ikemoto; Nobuaki Katayama; Yukio Terakura It is certified that error appears in the above—identified patent and that said Letters Patent is hereby corrected as shown below:

Item [73] should read as follows:

--[73] Assignee:

Toyota Jidosha Kogyo Kabushiki Kaisha--

Signed and Sealed this

Twenty-seventh Day of December 1983

[SEAL]

Attest:

GERALD J. MOSSINGHOFF

Attesting Officer     Commissioner of Patents and Trademarks